Dec. 8, 1970  J. MALESCHEW ET AL  3,545,261
CLAMPING CHUCK AND HARDNESS TESTER PROVIDED WITH SUCH CHUCK
Filed Oct. 11, 1966  3 Sheets-Sheet 2
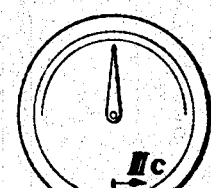
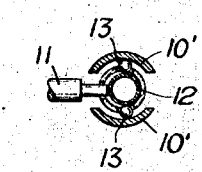
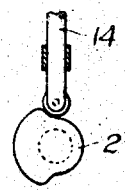
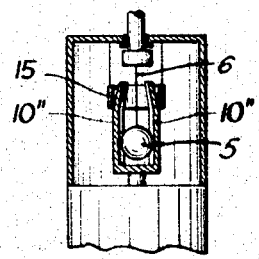
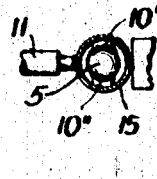
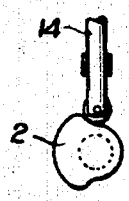
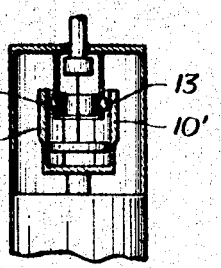
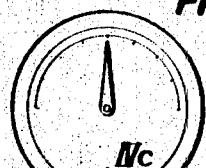
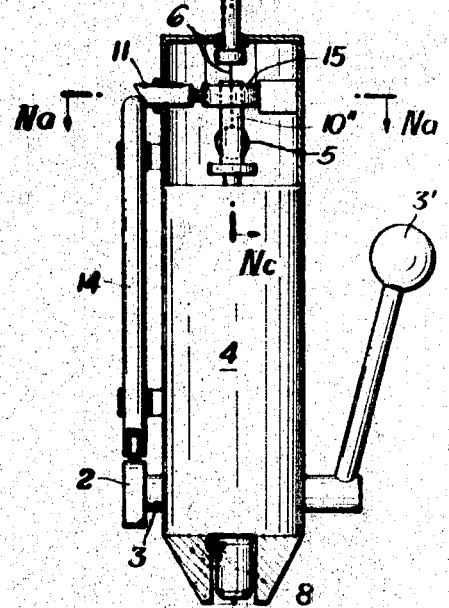

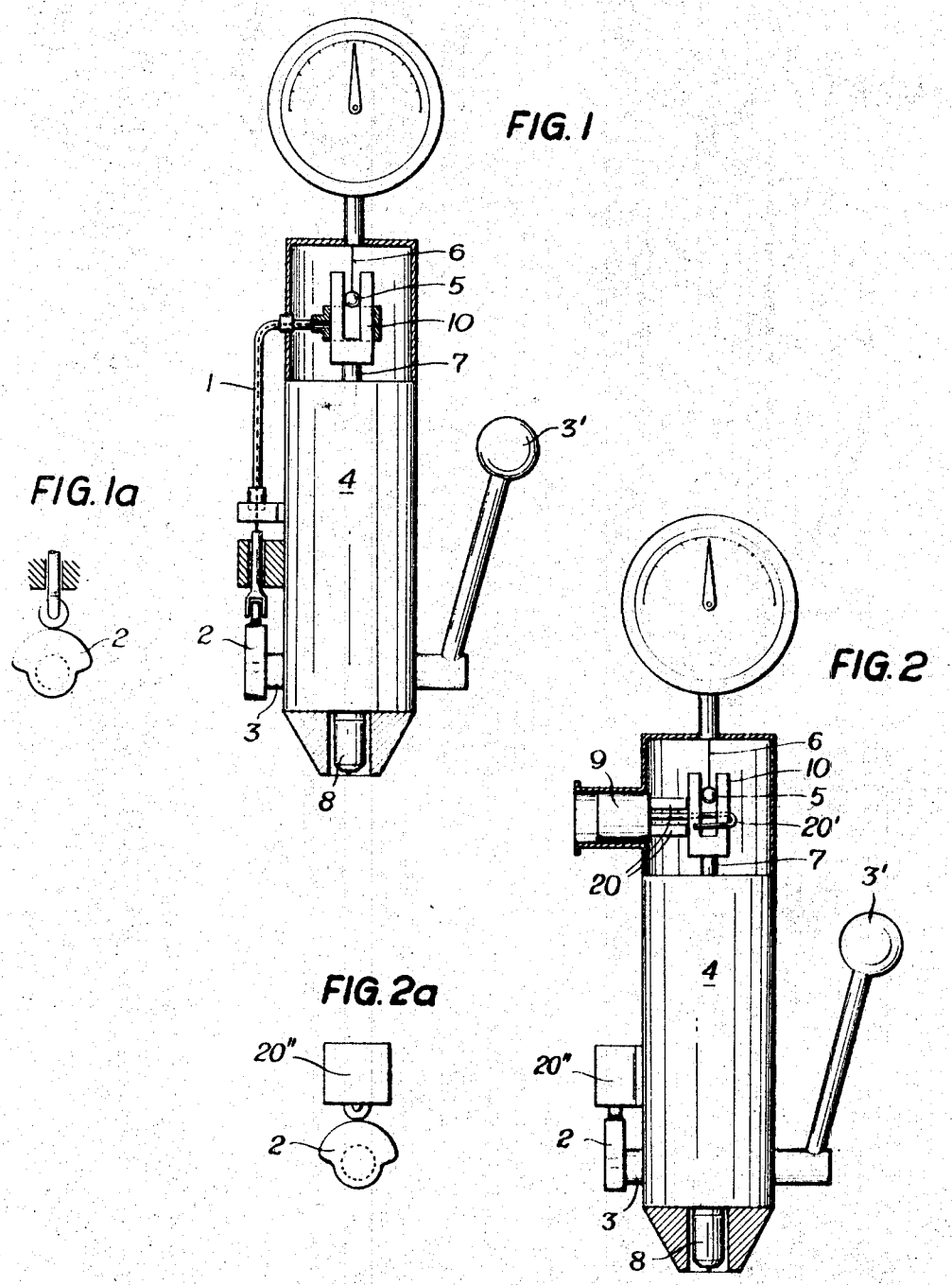

Dec. 8, 1970  J. MALESCHEW ET AL  3,545,261
CLAMPING CHUCK AND HARDNESS TESTER PROVIDED WITH SUCH CHUCK
Filed Oct. 11, 1966  3 Sheets-Sheet 3

INVENTORS
Josef Maleschew
Karl Brutmann
Fritz Gärtner
BY
Karl J. Ross
Attorney

United States Patent Office 3,545,261
Patented Dec. 8, 1970

3,545,261
CLAMPING CHUCK AND HARDNESS TESTER PROVIDED WITH SUCH CHUCK
Josef Maleschew and Karl Brutmann, Salzburg, and Fritz Gartner, Wien, Austria, assignors to Maier & Co., Fabrik für Spezialmaschinen, Salzburg, Austria, a corporation of Austria
Filed Oct. 11, 1966, Ser. No. 585,876
Claims priority, application Austria, Oct. 12, 1965, 9,236/65
Int. Cl. G01n 3/48
U.S. Cl. 73—81                  10 Claims

ABSTRACT OF THE DISCLOSURE

Two cooperating units, such as a hardness tester and an associated gauge, are temporarily interconnectable by a coupling device comprising a clamp with a pair of jaws adapted to grip a ball freely suspended therebetween by a flexible element such as a steel wire, the jaws being either closable around the ball or spreadable away therefrom by an actuator which operates, in a predetermined reference position of the parts to be interconnected, to have the clamp grip the ball from two sides.

---

This invention resides in a chuck or clamping device for a selective and exact coupling and uncoupling effective between two coaxial elements, e.g., between the feeler pin of a length-measuring instrument and the measuring arm or measuring pin of a length-indicating instrument or control elements of various devices, or between control equipment and its actuating elements. Such chuck is particularly useful where it is essential that the connection between the parts be effected without a displacement in their longitudinal direction and without any generation of lateral forces which might set up friction in the guide.

The clamping chuck according to the invention finds application especially in measuring operations in which differences between two measures must be ascertained, e.g., in hardness-testing operations where the difference between the depth of penetration of a penetrator under the total test load and the initial value consisting of the depth of penetration under a reference load is to be ascertained as a measure of the hardness of the material. Another possible application of the invention is, e.g., in machining where material is to be removed from a workpiece having a given dimension, e.g., by turning. In this case, the invention may be used for terminating the feeding of the tool exactly at the time when the dimension has been reduced to a predetermined extent.

In connection with such testing processes, chuck structures are known in which coupling discs are electromagnetically forced against each other. Other chucks for measuring instruments have been disclosed in the literature, e.g., in "Technische Härtemessung," by H. von Weigraber, C. Hanser Verlag, Munich, pp. 168–170.

Compared to these structures, a clamping chuck according to the invention for a selective coupling and uncoupling of two coaxial elements is characterized by a rod-shaped chuck member, which is freely movable transversely to the axis of the elements to be connected.

A significant advantage of the subject matter of the invention over the prior art is that the coupling operation does not involve any appreciable internal forces, which might set up friction in the guides of the elements to be connected.

A further advantage will be obtained, in a preferred embodiment of the invention by the provision of a resilient ring, which is deformable by the linkage for actuating the chuck and which holds the clamp closed when the ring is undeformed so that there is no need for contact between the clamp and the linkage for actuating the chuck when the latter is in coupling position.

The invention will be described in greater detail hereinafter with reference to the accompanying drawing in which:

FIGS. 1 and 1a shows an embodiment of the chuck applied to a conventional hardness tester;

FIGS. 2 and 2a illustrates the actuation of the clamp by a solenoid;

FIGS. 3, 3a, 3b and 3c illustrate another mode of actuation of the clamp;

FIGS. 4, 4a, 4b and 4c illustrate another embodiment of the actuating means;

Figure 5:
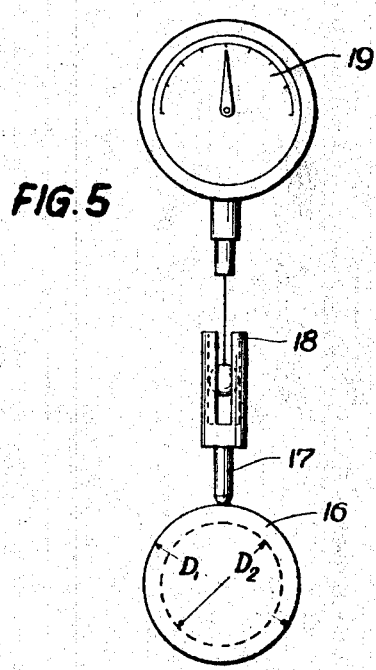
FIG. 5 shows by way of example the measurement of the reduction in diameter obtained by turning or grinding a workpiece.

FIG. 1 shows a chuck associated with a known hardness tester 4. A clamp 10 is actuable by means of a pressure-operable Bowden cable, e.g. as used for photographic purposes, or a similar element 1. The Bowden cable or the like is pressure-operated by a camwheel 2 (FIG. 1a) which is mounted on a shaft 3 of an actuating lever 3'. This operation is effected at the time at which a penetrator 8 of the hardness tester has penetrated the surface of the test specimen under or reference load. The actuating element 1 forces the two jaws of the clamp 10 towards each other so that the clamp 10 grips a ball 5 which is disposed at the end of a steel wire 6. The latter is freely movable transversely to the direction of measurement. When the ball is gripped, the chuck connects the feeler pin of a dial gauge to a measuring rod 7 of the hardness tester. By an upwardly directed measuring force, this biasing rod 7 is urged to a zero position determined by a stop. The dial gauge will then indicate the further penetration of the penetrator 8 under the action of testing loads. The steel wire 6 provided with the ball 5 constitutes a flexible, elongate suspension element which is freely movable transversely to the axis of the coaxial elements to be interconnected and enables the coupling operation to be effected without generation of appreciable lateral forces that may be due to misalignment of the chuck members and might set up friction in the guides.

As shown in FIG. 2, the clamp is actuated by a solenoid 9 which urges two fixed extensions 20 against the left-hand jaw of the clamp straddling the ball 5 whereas a movable armature 20' of the solenoid pulls the right-hand jaw of the clamp to the left. The solenoid 9 is energized by a switch 20" (FIG. 2a) which is actuated by the camwheel 2.

According to FIGS. 3, 3a, 3b and 3c, a plunger 11 is used for deforming a resilient spreader ring 12 which, when thus deformed, opens by means of balls 13 a clamp 10' previously closed under initial stress. The plunger 11 is moved by an eccentric 2 by means of a stem 14. In this embodiment, the actuating linkage 11, 14 is not in contact with the chuck when the latter is closed.

The same additional advantage is inherent in the embodiment shown in FIGS. 4, 4a, 4b and 4c. In this case, too, a clamp 10" is closed when a resilient ring 15 is undeformed and there is no contact with the actuating linkage 11, 14 in this position. To open the chuck, the plunger 11 effects a resilient deformation of the ring 15.

According to FIG. 5, a workpiece 16 to be turned had a diameter $D_1$ before machining. This diameter is sensed by a pin 17 of the measuring instrument. A clamp 18 is then closed by any of the means described so that a dial gauge 19 is coupled to the measuring linkage. When the machining has been completed, the turned workpiece has a diameter $D_2$. The reduction $$\frac{D_1 - D_2}{2}$$

can be read from the dial gauge. The dial gauge may be replaced by a limit indicator, which closes a contact to terminate the machining of the workpiece when the measure has been reduced to a predetermined extent.

In all embodiments which have been described, the arrangement may be reversed in such a manner that the clamp is attached to the dial gauge and the steel wire is attached to the measuring linkage.

Figures 6A, 6B:
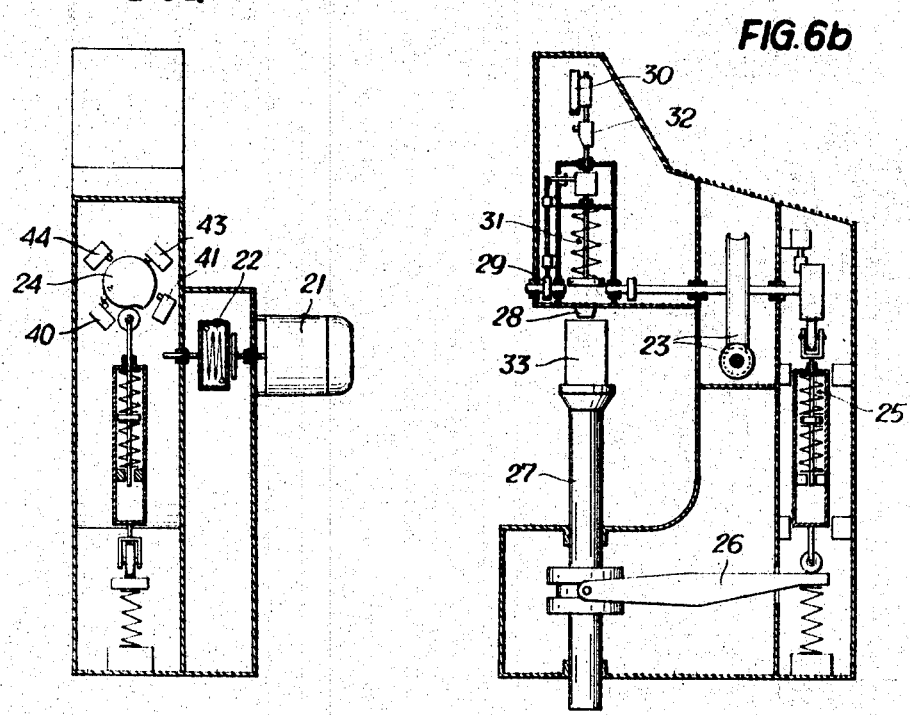
FIGS. 6a and 6b show an automatic hardness tester provided with a clamping chuck according to the invention.

The mode of operation of the hardness tester shown in FIGS. 6a and 6b will now be described.

A driving motor 21 is running. A magnetic clutch 22 connects the motor shaft to a worm gearing 23. A cam 24, a spring strut 25, a rocker lever 26 and a positioning screw 27 cause a test specimen 33 to be forced against the testing head 28. The spring strut 25 constitutes a constant, force-transmitting and consequently shock-absorbing resilient connection between the cam 24 and the rocker lever 26. The prestressing of the two spring sets of the spring strut results in a limitation of the gripping force.

The constant transmission of force between parts 24 and 36 allows for a sharp drop in the periphery of the cam during release without disengagement and consequently a flat rise for gripping. This results in a higher speed of the gripping and releasing operations.

An eccentric shaft 29 rotates with the cam and causes the penetrator to be applied to the test specimen 33 and to produce an impression due to the reference load. A dial gauge 30 is coupled to a measuring rod 31 by the means which have been described with reference to FIGS. 1, 3 or 4. In the reference load position, the cam 24 actuates a switch 40 so that the magnetic clutch 22 is deenergized for a predetermined time with the aid of a delay relay, not shown. The delay relay permits of a continuous adjustment of the time interval during which the reference is applied. When the preset delay time has elapsed, the magnetic clutch 22 is re-energized so that the eccentric shaft 29 applies the additional load.

When main load is applied to the test specimen, a switch 41 is operated which enables by means of a delay relay, in the manner described above, a continuous adjustment of the time interval during which the main load is applied.

A continued rotation of the eccentric shaft 39 relieves the test specimen of the additional load. A switch 43 and a limit indicator 32, which is connected to the dial gauge 30, cause an indication of the result of measurement with certain tolerances. The holding relay maintains this indication until the next testing cycle. The connection between the dial gauge 30 and the measuring rod 31 is then interrupted. The dial gauge 30 returns now to its zero position. The test specimen is released under the action of the cam 24, and the magnetic chuck 24 is deenergized by a switch 44. The test specimen can now be removed from the machine.

The advantages that may be afforded by the hardness tester which has been described may be summarized as follows:
(1) a suitable design of the spring strut enables a performance of the gripping and release operations within a fraction of a second without any shock;
(2) the times for which the reference load and the main load are applied can be continuously adjusted;
(3) an absolutely perpendicular penetration of the penetrator is ensured;
(4) the testing cycle is uniformly performed without any interference.

It will be noted that, in all the disclosed embodiments, an input member 19' of the gauge 19 (see FIG. 3) is vertically aligned with the flexible element 6 extending therefrom, with the enlarged head or ball 5 secured to the free lower extremity of this element, and that the member 7 carrying the associated clamp, i.e., the upward extension of the feeler 4' of hardness tester 4 which in operation comes into contact with the workpiece 33, is also vertically aligned therewith as well as with the workpiece carrier 27 shown in FIG. 5b.

What is claimed is:
1. A coupling device for temporarily interconnecting two intermittently co-operating members, comprising a flexible elongate vertical element extending from one of said members, a clamp extending from the other member and having a pair of jaws straddling a free extremity of said element, said jaws being laterally movable toward and away from each other between a disengaged position and an engaged position for respectively gripping and releasing said extremity, and actuating means for alternately moving said jaws into said positions.

2. A device as defined in claim 10 wherein said extremity carries a ball grippable by said jaws.

3. A device as defined in claim 11 wherein said jaws are biased into said engaged position, said actuating means being operable to spread said jaws apart against their biasing force.

4. A device as defined in claim 12 wherein said actuating means comprises a deformable spreader bearing upon said jaws and a pusher laterally separated from said spreader in the engaged position of said jaws but laterally movable into contact with said spreader for deforming same to move said jaws into their disengaged position.

5. A device as defined in claim 13 wherein said spreader is a ring contacting said jaws at diametrically opposite locations.

6. A device as defined in claim 10 wherein said vertical element is a steel wire.

7. In combination, a carrier for a workpiece, feeler means aligned with said carrier for engaging said workpiece, said feeler means having an extension member movable in a predetermined direction in response to dimensional changes of said workpiece, indicator means provided with an input member independently movable in said direction and aligned with said extension member in said direction, a laterally deformable elongate element extending in said direction from one of said members, a clamp on the other of said members having a pair of jaws straddling a free end of said elements, said jaws being laterally movable transversely to said direction toward and away from each other between a disengaged position and an engaged position for respectively gripping and releasing said free end, and actuating means for alternately moving said jaws into said positions.

8. The combination defined in claim 7 wherein said indicator means is a hardness gauge and said feeler means comprises a penetrator, said carrier being provided with biasing means for subjecting said workpiece to a reference load and with switchover means for replacing said reference load by a larger working load, said actuating means being coupled with said switchover means for moving said jaws into said engaged position in the presence of said reference load and for returning same to said disengaged position after registration of said gauge of the penetration of said workpiece by said penetrator under said working load.

9. The combination defined in claim 8 wherein said penetrator and said members are vertically aligned with one another and with said support, said laterally deformable element being a flexible wire.

10. The combination defined in claim 9 wherein said wire is provided at said free end by an enlarged head grippable by said jaws.

References Cited

UNITED STATES PATENTS

| | | | |
|---|---|---|---|
| 2,122,203 | 6/1938 | Gogan | 73—83 |
| 299,362 | 5/1884 | Ellinwood | 279—36 |
| 2,670,215 | 2/1954 | Fishwick | 279—36 |
| 2,892,344 | 6/1959 | Sklar | 73—83 |

RICHARD C. QUEISSER, Primary Examiner

J. K. LUNSFORD, Assistant Examiner

U.S. Cl. X.R.

73—103; 279—36